US009886462B1

(12) United States Patent
Goel

(10) Patent No.: US 9,886,462 B1
(45) Date of Patent: *Feb. 6, 2018

(54) SELECTING CONTENT USING A LOCATION FEATURE INDEX

(71) Applicant: Google Inc., Mountain View, CA (US)

(72) Inventor: Gagan Goel, New York, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/095,363

(22) Filed: Apr. 11, 2016

Related U.S. Application Data

(63) Continuation of application No. 13/794,395, filed on Mar. 11, 2013, now Pat. No. 9,311,416.

(60) Provisional application No. 61/747,592, filed on Dec. 31, 2012.

(51) Int. Cl.
*G06F 17/30* (2006.01)

(52) U.S. Cl.
CPC .. *G06F 17/30321* (2013.01); *G06F 17/30241* (2013.01); *G06F 17/30522* (2013.01); *G06F 17/30554* (2013.01)

(58) Field of Classification Search
CPC . G06F 17/30; G06F 17/30386; G06F 17/3087
USPC ................. 707/709, 711, 715, 724
See application file for complete search history.

(56) References Cited

U.S. PATENT DOCUMENTS

| 7,650,431 | B2 | 1/2010 | Wang et al. |
| 8,024,314 | B2 | 9/2011 | Wang et al. |
| 8,302,030 | B2 | 10/2012 | Soroca et al. |
| 2007/0100801 | A1* | 5/2007 | Celik ................ G06F 17/30386 |
| 2007/0208616 | A1 | 9/2007 | Choi |
| 2009/0076906 | A1 | 3/2009 | Kansal et al. |
| 2009/0138445 | A1* | 5/2009 | White .................... G06Q 30/02 |
| 2010/0049609 | A1 | 2/2010 | Zhao et al. |
| 2010/0161591 | A1 | 6/2010 | Jones et al. |
| 2012/0066199 | A1 | 3/2012 | Ramer et al. |
| 2013/0132366 | A1 | 5/2013 | Pieper |

OTHER PUBLICATIONS

Trevor Forbes Linton; "Semantic Feature Analysis in Raster Maps", School of Computing The University of Utah, Aug. 2009, 62 pages.*

* cited by examiner

*Primary Examiner* — Monica Pyo
(74) *Attorney, Agent, or Firm* — Fish & Richardson P.C.

(57) ABSTRACT

Systems and methods of providing content for display on a computing device via a computer network using a location feature index are provided. A data processing system can receive a request for content from the computing device, and can determine a geographic location of the computing device associated with the request for content. The data processing system can identify a keyword indicating a non-geographic semantic feature of the determined geographic location. The identification can be based on the determined geographic location and from a location feature index that maps geographic areas to keywords that indicate non-geographic semantic features of the geographic areas. The data processing system can select, based on the keyword, a candidate content item for display on the computing device.

20 Claims, 6 Drawing Sheets

SELECTING CONTENT USING A LOCATION FEATURE INDEX

CROSS-REFERENCE TO RELATED APPLICATIONS

This is a continuation of U.S. application Ser. No. 13/794,395, filed on Mar. 11, 2013, which claims priority to U.S. Provisional Application No. 61/747,592, filed on Dec. 31, 2012. The disclosures of the prior applications are considered part of and are incorporated by reference in the disclosure of this application.

BACKGROUND

In a networked environment such as the internet, entities such as people or companies can provide information for public display on web pages or other documents. The web pages can include text, video, or audio information provided by the entities via a web page server for display on the internet. Additional content can also be provided by third parties for display on the web pages together with the information provided by the entities. Thus, a person viewing a web page can access the information that is the subject of the web page, as well as third party content that may appear with the web page.

SUMMARY

At least one aspect is directed to a method of providing content for display on a computing device via a computer network. The method can include a data processing system receiving a request for content from the computing device. The data processing system may receive the request via the computer network. The method may include determining a geographic location of the computing device associated with the request for content. The method may include identifying keyword indicating a non-geographic semantic feature of the determined geographic location. The identification may be based on the determined geographic location and from a location feature index. A location feature index may map geographic areas to keywords that indicate non-geographic semantic features of the geographic areas. The method may include selecting a candidate content item for display on the computing device. The candidate content may be selected based on the keyword.

At least one aspect is directed to a data processing system for providing content for display on a computing device via a computer network. The data processing system can determine a geographic location of the computing device associated with a request for content. The data processing system can to identify a keyword indicating a non-geographic semantic feature of the determined geographic location. The data processing system can make the identification based on the determined geographic location and using a location feature index that maps geographic areas to keywords that indicate non-geographic semantic features of the geographic areas. The data processing system can select a candidate content item for display on the computing device. The candidate content may be selected based on the keyword.

At least one aspect is directed to a computer readable storage medium having instructions to provide content for display on a computing device via a computer network. The instructions can include instructions to receive a request for content. The instructions can include instructions to determine a geographic location of the computing device associated with the request for content. The instructions can include instructions to identify a keyword indicating a non-geographic semantic feature of the determined geographic location. The identification can be based on the determined geographic location and from a location feature index that maps geographic areas to keywords that indicate non-geographic semantic features of the geographic areas. The instructions can include instructions to select a candidate content item for display on the computing device. The candidate content item can be selected based on the keyword.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Figure 1:
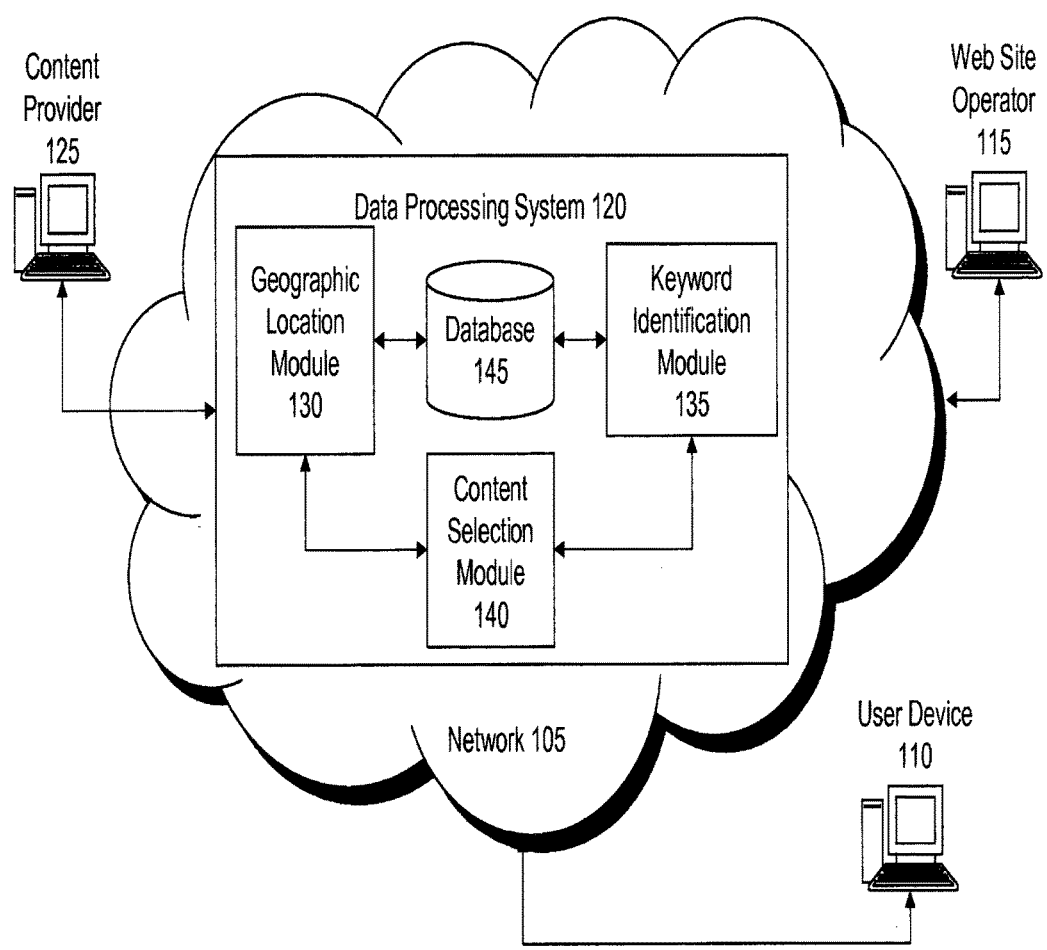
FIG. 1 is an illustration of an example system for providing content for display on a computing device via a computer network in accordance with an implementation.

The present disclosure is directed generally to systems and methods of selecting content items such as ads for display on computing devices using a location feature index. The location feature index can map geographic areas to keywords that indicate non-geographic semantic features or characteristics of the geographic areas. These keywords can be used by the data processing system to identify content items that can be provided for display on computing devices that are present in the geographic location. The keywords and the content items identified using the keywords need not indicate the geographic area or actual goods or services available within the geographic area. Rather, the keywords can indicate a more general characteristic or feature of the geographic area.

For example, the data processing system can determine that a geographic location has high end retail clothing stores. From a semantic analysis of this information, the data processing systems can identify keywords "diamonds" "luxury car" or "tropical beach vacation" and associate or map these keywords to the geographic area. The data processing system can receive a request for content to display on a computing device in the geographic area, e.g., the computing device is in the vicinity of the high end retail clothing stores. Responsive to the request, the data processing system can use the "tropical beach vacation" keyword to select a content item for a luxury tropical resort as a candidate for display on the computing device responsive to the request. In this example, the geographic area having high end clothing stores can be unrelated to any tropical location, although a user of a computing device (e.g., a smartphone) walking down a street having high end clothing stores may also be interested in high end luxury vacations. Thus, the data processing system can identify a group of keywords for one or more geographic areas based on semantic features or characteristics of those areas, and content providers can select content for a type of geographic area (e.g., high end retail areas) in general rather than focusing on a single area such as one set of latitude and longitude coordinates near a particular clothing store.

In another example, the data processing system can identify keywords "sunscreen" "umbrella" or "shoes" based on characteristics of a park, such as historical, current, or predicted climate conditions of the park, available shelter in the park, or hiking paths available in the park. The location feature index can indicate that these keywords correspond to the geographic area of the park. The data processing system may receive an indication from a content provider that the content provider would like to provide content items to "users who are walking in any park" as part of a computer network based content item placement campaign. The data processing system may also receive a request for content from a computing device located in a park. In this example, the data processing system can use the keywords "sunscreen" "umbrella" or "shoes" to select a content item of the content provider as a candidate for display on the computing device.

FIG. 1 illustrates an example system 100 for identifying content via a computer network such as network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be displayed on at least one user device 110, such as a laptop, desktop, tablet, personal digital assistant, smart phone, or portable computers. For example, via the network 105 a user of the user device 110 can access web pages provided by at least one web site operator 115. In this example, a web browser of the user device 110 can access a web server of the web site operator 115 to retrieve a web page for display on a monitor of the user device 110. The web site operator 115 generally includes an entity that operates the web page. In one implementation, the web site operator 115 includes at least one web page server that communicates with the network 105 to make the web page available to the user device 110.

The system 100 can include at least one data processing system 120. The data processing system 120 can include at least one logic device such as a computing device having a processor to communicate via the network 105, for example with the user device 110, the web site operator 115, and at least one content provider 125. The data processing system 120 can include at least one server. For example, the data processing system 120 can include a plurality of servers located in at least one data center. In one implementation, the data processing system 120 includes a content placement system having at least one server. The data processing system 120 can also include at least one geographic location module 130, at least one keyword identification module 135, at least one content selection module 140, and at least one database 145. The geographic location module 130, keyword identification module 135, and content selection module 140 can each include at least one processing unit or other logic device such as programmable logic array engine, or module configured to communicate with the database 140. The geographic location module 130, keyword identification module 135, and content selection module 140 can be separate components, a single component, or part of the data processing system 120.

In some implementations, the data processing system 120 obtains anonymous computer network activity information associated with a plurality of user devices 110. A user of a user device 110 can affirmatively authorize the data processing system 120 to obtain network activity information corresponding to the user's user device 110. For example, the data processing system 120 can prompt the user of the user device 110 for consent to obtain one or more types of network activity information, such as geographic location information. The identity of the user of the user device 110 can remain anonymous and the user device 110 may be associated with a unique identifier (e.g., a cookie).

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether or how to receive content from the content server that may be more relevant to the user. In addition, certain data may be treated in one or more ways before it is stored or used, so that certain information about the user is removed when generating parameters (e.g., demographic parameters). For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information is collected about the user and used by a content server.

In some implementations, the data processing system 120 receives a request for content. The content may include, e.g., text, characters, symbols, images, video, audio, or multimedia content. For example, the request for content may include a request for an online advertisement, article, promotion, coupon, or product description. The data processing system 120 may receive the request from a computing device such as, e.g., user device 110. In some implementations, the data processing system 120 receives the request via an application executing on the user device 110. For example, a mobile application executing on a mobile device (e.g., smart phone or tablet) may make a request for content. In another example, a web page may request content from the data processing system 120 responsive to a user of a mobile device 110 visiting the web page (e.g., via a mobile device 110).

In some implementations, the request for content includes information that can facilitate content selection. In some implementations, the data processing system 120 may request information from the user device 110 to facilitate identifying content or content selection. The data processing system 120 may request or obtain information responsive to receiving a request for content from the user device 110. The information may include information about displaying the content on the user device 110 (e.g., a content slot size or position) or available resources of user device 110 to display or otherwise manipulate the content.

In some implementations, the data processing system 120 determines a geographic location of the user device 110 associated with the request for content. As shown in the illustrative example of FIG. 2, a user device 110*a* making a request for content may be in a geographic location. The data processing system 120 may determine the geographic location based on, e.g., GPS, Wi-Fi, or cell tower triangulation techniques. In some implementations, the data processing system 120 may determine a latitude and longitude coordinate and identify a larger geographic area or tile (e.g., 260, 262, 264, 266, 268, or 270) comprising the latitude and longitude coordinate. In this example, the geographic location may correspond to a latitude or longitude coordinate, or the geographic location may correspond to a larger area such as, e.g., block 260 which may be adjacent to at least a portion of First Side St. and Main St. In another example, the geographic area may correspond to an area that is larger than a block; e.g., the data processing system 120 may determine that user devices 110*a*, 110*b*, and 110*c*, which are on First Side St., Second Side St., and Third Side St., are in the same geographic area that corresponds to an area that includes at least a portion of Main St., First Side St., Second Side Street and Third Side St.

In some implementations, the request for content received by the data processing system 120 may include geographic location information. Geographic location information may include, e.g., latitude and longitude coordinates, geographic information system ("GIS") information, country, state, city, county, town, or precinct. In some implementations, the data processing system 120 may obtain geographic location information associated with the user device 110 via an application programming interface ("API") that can provide scripted access to geographic location information associated with the user device 110. For example, the geographic API specification may include a specification associated with the World Wide Web Consortium ("W3C").

In some implementations, the geographic location of the user device 110 can be determined via at least one of a global positioning system ("GPS"), cell tower triangulation, or Wi-Fi hotspots. The data processing system 120 may obtain geographic location information associated with at least one user device 110. Geographic location information may include city, county, state, country, or region data, for example. In some implementations, the data processing system 120 infers or determines geographic location information based on a user's interaction with an information resource. For example, the user device 110 may include a global positioning system ("GPS") or the data processing system 120 may determine a geographic location based on an internet protocol ("IP") address. For example, the user device 110 may include a GPS sensor or antenna and be configured to determine a GPS location of the user device 110. In another example, the data processing system 120 may determine the geographic location by using information obtained from one or more cell towers to triangulate the location of the user device 110. For example, and in some implementations, the geographic location determined based on one cell tower, two cell towers or three cell towers may be sufficient for content selection. In some implementations, Wi-Fi hotpots may facilitate determining a geographic location because Wi-Fi hotspots may be stationary and can be used as a landmark. For example, the relation of a user device 110 with respect to a Wi-Fi hotspot can facilitate determining a geographic location of the user device 110.

In some implementations, the data processing system 120 receives or determines a relatively more precise geographic location (e.g., a latitude and longitude coordinate) in order to identify a larger geographic area that includes the latitude coordinate and longitude coordinate. For example, the larger area may include a geographic tile that includes the relatively more precise geographic location. In another example, the geographic area may include a map tile that includes the latitude and longitude coordinate. In some examples, the data processing system 120 may receive or obtain the larger, less precise geographic area from the user device 110. For example, a mobile application of a smartphone may provide to the data processing system 120 a geographic area or map tile. The geographic area may be any shape or resemble any region that includes a geographic location of the user device 110 and facilitates identifying keywords using a location feature index. For example, a location feature index, as described further herein, may map larger geographic areas to keywords instead of or in addition to mapping relatively more precise latitude and longitude coordinate pairs to keywords.

In some implementations, the data processing system 120 identifies a keyword. The data processing system 120 may identify the keyword using or based on the determined geographic location associated with the user device 110. In some implementations, the data processing system 120 may identify the keyword based on the determined geographic location and from a location feature index. In some implementations, a location feature index can map geographic areas or locations to keywords that may indicate one or more non-geographic semantic features of the determined geographic location. The location feature index may be accessed from a server or stored in database 145. The geographic areas can be of any granularity or resolution that facilitates content selection using a location feature index. Non-geographic semantic features may indicate general characteristics or features of a geographic area, rather than indicate a specific geographic area or actual goods or services of a specific geographic area. For example, non-geographic semantic features may indicate that a place is sunny or warm, a park, a playground, a vacation spot, a honeymoon spot, or a luxury vacation spot, a high end retail area, or other semantic characteristic or metric.

In one implementation, the data processing system 120 identifies a plurality of keywords based on a feature metric of the geographic area. The feature metric can include at least one of a cost of living metric of the geographic area, a retail metric of the geographic area, a services metric of the geographic area, and online user reviews associated with the geographic area. For example, the cost of living metric can be obtained from a database or determined based on, e.g., one or more of publicly available real estate information, cost of food in the area, cost of commodities, or real estate tax information. In some implementations, the cost of living metric can indicate the cost of living relative to other geographic areas or a normalized cost of living metric. For example, the cost of living metric in a metropolitan city may be higher than the cost of living in a rural area.

The retail metric of the geographic area be based on, e.g., one or more of the number of retail stores, the type of retail stores, the size of the retail store, or the price of goods sold in the retail stores. For example, if the three retail stores on a block sell expensive jewelry, expensive clothes, and expensive shoes, the retail metric may indicate that there are a relatively high number of high end retail stores in the geographic area (e.g., a high value). In the other hand, if there are no retail stores in a geographic area, the retail metric may indicate that that there are no retail stores in a geographic area (e.g., a low value).

The services metric of the geographic area can be based on, e.g., one or more of the number of service providers in the geographic area, type of service providers, price of service providers, or quality of service providers. Types of service providers can include, e.g., consulting, legal, real estate, education, communications, storage, or processing. For example, if a geographic area comprises mostly of financial and legal service providers, then the services metric may indicate that the geographic area corresponds to a financial district of a city.

The online user reviews metric may indicate what positive, negative, or neutral feedback associated with a geographic area or an entity of a geographic area. For example, the user review metric may indicate whether a retail store or restaurant is looked at favorably by patrons. In another example, the user reviews metric may combine the user review information associated with a plurality of retail establishments of an area to generate an overall online review metric for an area. For example, retail stores and restaurants of a geographic area may each have a different rating, where the combined average rating may indicate an online user review metric for the geographic area.

The data processing system 120 can generate, receive or update the location feature index. In some implementations, the data processing system 120 generates the location feature index prior to receiving a request for content from a user device 110. In some implementations, the data processing system 120 can update the location feature index before, during, or after receiving a request for content. For example, the data processing system may update the location feature index responsive to the request for content or an interaction associated with content that was provided for display on the user device 110 (e.g., a click or conversion of a content item). In some implementations, the data processing system 120 may update or modify a location feature index responsive to a user of user device 110 interacting with the displayed content in a desired manner or based on a user not interacting with the displayed content.

Figure 2:
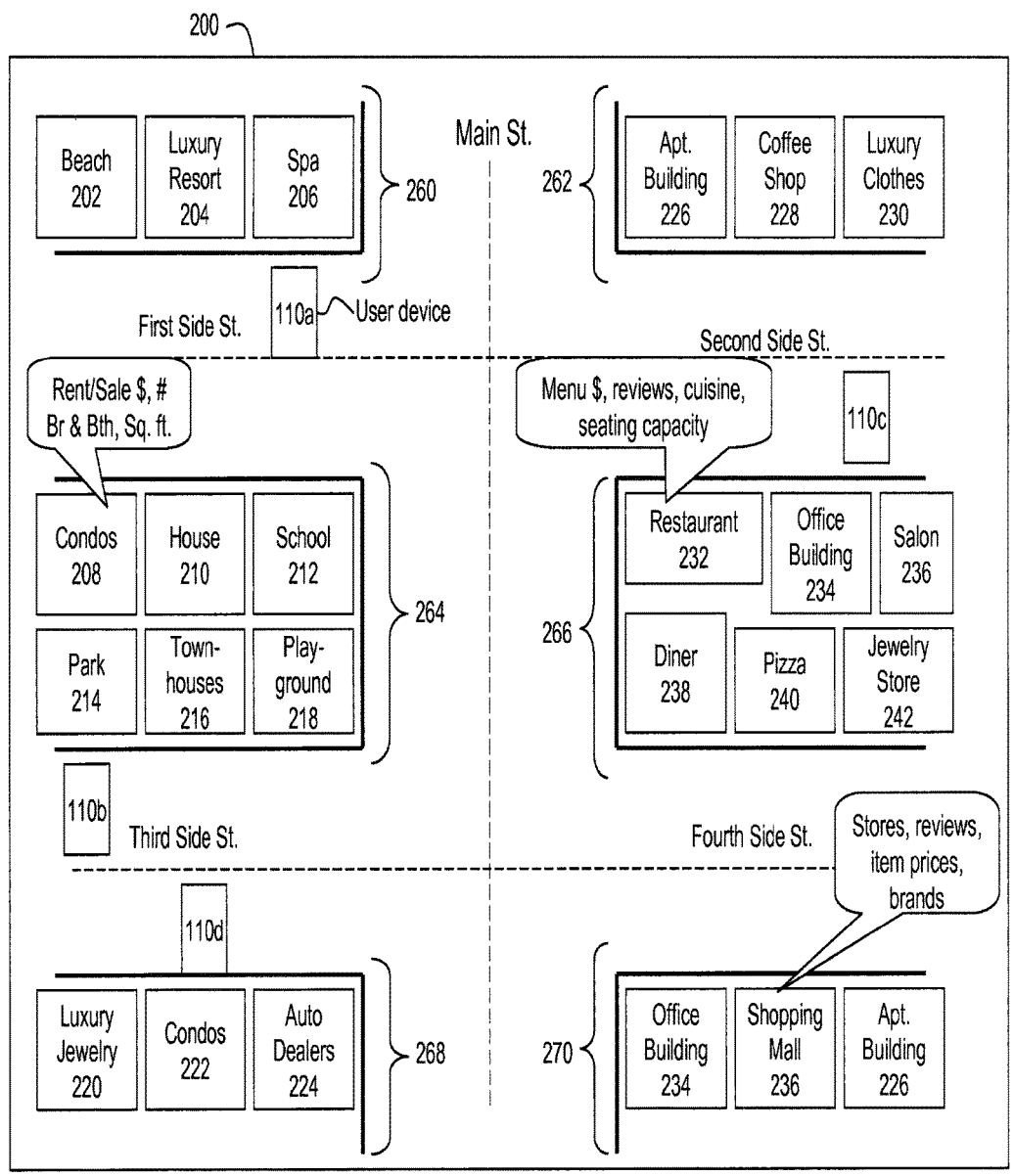
FIG. 2 is an illustration of an example map of one or more geographic locations or areas in accordance with an implementation.
Figure 3:
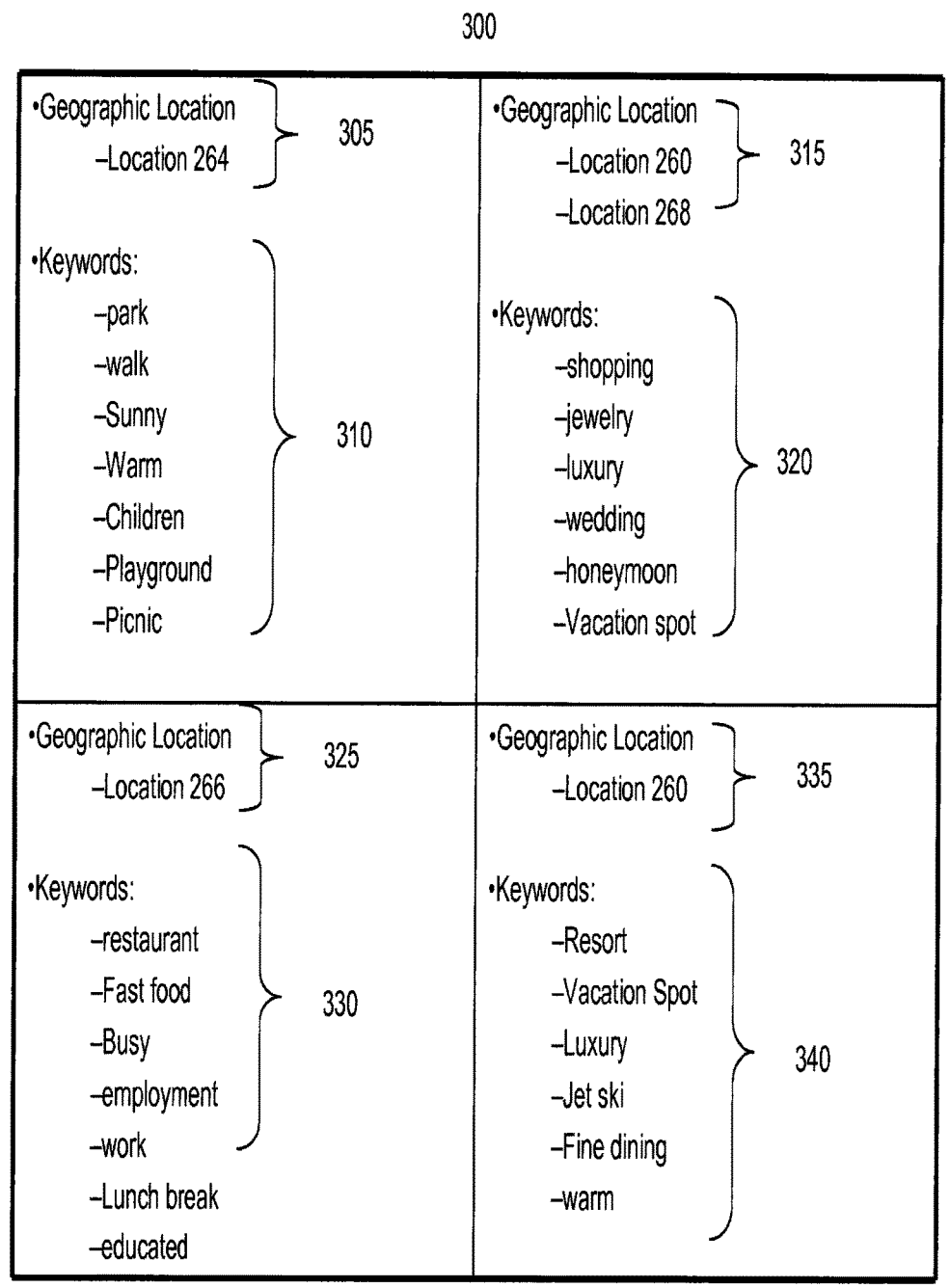
FIG. 3 shows an illustration of an example location feature index in accordance with an implementation.

Referring to FIG. 2, the data processing system 120 can receive semantic information about a geographic location or area 200 to facilitate generating the location feature index. The geographic area 200. In this example, the data processing system 120 may receive semantic information about condos 208 on First Side St. The semantic information about one or more of the condos 208 may include the rental price, the sale price, the number of bedrooms, the number of bathrooms, the number of square feet in a unit, the year the units were built, etc. The data processing system 120 may obtain this information from an online databases or web page via the network 105. Based on this semantic information, the data processing system 120 may identify one or more keywords that indicate non-geographic semantic features and include them in the location feature index for that geographic area. For example, FIG. 3 illustrates a location feature index 300 that includes geographic locations (e.g., 305, 315, 325 and 335) mapped to semantic keywords (e.g., 310, 320, 330, and 340). In one implementation, while the keywords are mapped to a geographic area (e.g., area 200 of FIG. 2) they indicate non-geographic semantic features such as "wedding" "picnic" or "jewelry" rather than geographic based features such as keywords indicating a particular good or service at a defined geographic location, such as a particular coffee shop or sports team located in or near (e.g., in the same city) as the area 200.

Continuing with the above example and referring to FIGS. 2 and 3, if user device 110a requests content, the data processing system 120 may determine that the geographic location (e.g., latitude and longitude coordinates) of the user device 110a corresponds to a geographic area 260, (or in some examples to the more general geographic area 200). Based on the determined geographic area 260, the data processing system may identify at least one keyword using the location feature index 300. For example, the location feature index 300 may including a mapping of geographic location 260 to keywords 320 of FIG. 3. For example, the geographic location 260 can include a beach 202, luxury resort 204 and a spa 206. Keywords associated with the geographic location 264 may be based on semantic information about the geographic location 260, including, e.g., semantic information about beach 202, luxury resort 204, and spa 206. For example, the location feature index may map geographic location 260 to keywords 310 including, e.g., resort, vacation spot, luxury, jet ski, fine dining, or warm, as shown in the location feature index 300. In some implementations, the semantic information arises from a non-geographic interpretation of the features of the geographic area. For example, the keywords "resort" or "vacation spot" or "jet-ski" are not bound to any particular geographic location.

The semantic information can indicate various metrics such as a quality of life metric, an education metric, a population metric, a topographical metric, or a climate metric. For example, the quality of life metric can be based on publicly available real estate information including, e.g., real estate prices, sale prices, assessed values, property taxes, rental prices, foreclosure information, property information (e.g., square foot, number of bedrooms, number of bathrooms, number of garages, lot size, or whether there is a pool).

In some implementations, the semantic information indicates an education metric, based for example on the amount of education attained by individuals in the geographic area including, e.g., whether they have high school diplomas, associates degrees, bachelors degrees, masters degrees, doctor of philosophy, medical degree, juris doctor degree, for example. In some implementations, the education metric may be further based on the type of degrees such as, e.g., technical degree, liberal arts degree, science degree, for example. The data processing system 120 may obtain this information from publicly available college graduation metrics or types of employers in an area.

In some implementations, the semantic information may indicate a population metric such as, e.g., the population density, household size, or other population-related metrics. In some implementations, the semantic information may indicate a topographical metric or a climate metric. Topographical metrics may include natural or man made features on the ground such as, e.g., elevations, landforms, whether the geographic area is near a body of water (e.g., on or near a lake, ocean, beach, pond, swamp, marsh, etc). Climate metrics may include, e.g., current temperature or a historical temperature for a certain time of year, season, month, week, or day. Climate metrics may include precipitation information including, e.g., amount of rainfall or snow for a given time interval. In some implementations, climate metrics may include general weather-related information such as, e.g., warm, hot, sunny, cloudy, windy, cold, or freezing. For example, a vendor that sells high end rain jackets may indicate that they want to display advertisements for their products to users who are walking near a luxury clothing store in the rain or in geographical area during a time of year associated higher than average precipitation. Further to this example, if the data processing system 120 determines that a request for content is associated with a geographic location that maps to keywords "luxury" "store" "raining" "rainy season" or "April" the data processing system 120 may select the content providers content for display on the user device 110 associated with the request for content.

In some implementations, the data processing system 120 selects content (e.g., an advertisement) for display on the user device 110. The data processing system 120 may select the content based on the keyword. For example, the data processing system 120 can identify the keyword using the location feature index and select a content that is related or associated with the keyword. For example, the content may include the identified keyword, be synonymous with the keyword, or be semantically or topically related to the keyword. In some embodiments, the data processing system 120 selects a content item (e.g., an ad) as a candidate for display. For example, the data processing system 120 may provide a candidate content item to an online auction with a plurality of content items where the content item associated with the highest bid (e.g., the highest bid price made for content of a content provider 125) or other factors such as the highest quality content item is selected and provided for display on the user device 110. In some examples, the data processing system 120 may select or identify multiple candidate content items based on at least one keyword, and further select a content item from the candidates to provide for display on the user device 110 based on relevance factors, quality factors, click through rate, or conversion rate.

Referring to FIG. 2, the geographic area 200 includes additional geographic areas (e.g., 260, 262, 264, 266, 268, 270) that may have, for example, streets, residential and commercial property, retail stores, service stores, educational buildings, recreational areas, or lakes. In some implementations, the data processing system 120 can obtain information about one or more of these geographic areas. For example, at the geographic location 266, the data processing system 120 may identify restaurant 232, office building 234, salon 236, diner 238, pizza restaurant 240, and jewelry store 242. In some implementations, the data processing system 120 can further identify or obtain semantic information about a geographic area or a property within the geographic area. For example, the data processing system may obtain semantic information for restaurant 232 within geographic area 266 that includes, e.g., menu items, menu prices, customer reviews, type of cuisine, seating capacity, popularity of the restaurant, dress requirements, reservation wait time, number of years in business, or other semantic information that may facilitate the identification or generation of keywords associated with the geographic area. For example, if the average menu prices for lunch at restaurant 232 is less than $3, the restaurant 232 does not take reservations, there is no dress code, and there is take out, the data processing system 120 may identify a keyword "fast food". In some implementations, the data processing system 120 may generate or update a location feature index by mapping the geographic area 266 to keywords fast food, lunch, or inexpensive.

Further to this example, the data processing system 120 may receive additional semantic information about the geographic location 266 such as, e.g., semantic information relating to the office building 234, pizza restaurant 240, and diner 238. For example, the data processing system 120 may identify that the office building 234 includes an engineering entity, software entity, and a financial services entity. Based on this information, the data processing system 120 may identify keywords work, education, busy, and employed. In some implementations, the data processing system 120 may generate or update a location feature index by further mapping the geographic area 266 to keywords work, education, busy, and employed.

In some implementations, the data processing system 120 may map geographic locations to keywords that are directed to a different geographic location. For example, semantic information related to luxury jewelry store 220 may map to keywords such as, "wedding location" "honeymoon location" or "luxury vacation spot". For example, the data processing system 120, can determine that a request for content was received from a user device 110d located in geographic area 268, and can proceed to select a content item for a luxury resort 204 or spa 206 located in a different geographic area, such as, e.g., geographic area 260 using the keywords that indicate non-geographic semantic features of the geographic area 260. In this example, The data processing system 120 may employ one or more techniques to generate a location feature index that maps geographic areas to keywords that indicate non-geographic semantic features. For example, the data processing system 120 may access historical weather reports to determine an expected climate for a geographic area for a given time of year. In another example, the data processing system 120 may access current weather reports via network 105 to determine current weather conditions.

In some implementations, the data processing system 120 may employ semantic analysis to identify keywords that map to a geographic area. In some implementations, the location feature index may include latitude and longitude coordinates that map to keywords. In some implementations, the location feature index may include multiple mappings. For example, a first map may map latitude and longitude coordinate pairs to representative latitude and longitude coordinate pairs. A second map may map the representative latitude and longitude coordinate pairs to a set of keywords. Representative latitude and longitude coordinate pairs may include a latitude and longitude coordinate pair that is different than the latitude and longitude coordinate pair, but otherwise be similarly associated. For example, the representative latitude and longitude coordinate pair may correspond to a local cell tower, WiFi hotspot, geographic area, tile, etc. In some implementations, the representative latitude and longitude coordinate pair may correspond to a general area within which the user device 110 has been located during a time interval.

The location feature index can map multiple geographic locations may to one or more keywords or a set of keywords. For example, one or more keywords in the location feature index can map to multiple geographic locations. Referring to FIG. 3, the location feature index 300 includes geographic locations 260 and 268 that both map to keywords 320. In some examples, geographic location 260 may be relatively close to geographic location 268, while in other examples geographic location 260 may be relatively far away from geographic location 268 or unrelated to each other except for one or more common keywords based on related semantic information. For example, geographic location 260 includes a beach 202, luxury resort 204 and spa 206, and geographic location 268 includes luxury jewelry 220, condos 222, and auto dealers 224. Based on semantic information about the geographic locations 260 and 268, the location feature index may map these geographic locations to keywords 320 such as shopping, jewelry, luxury, wedding, honeymoon or vacation spot. In this example, the data processing system 120 may select similar responsive to content requests received from user device 110a and 110d because the user devices are located in geographic locations 260 and 268 that map to one or more of the same keywords 320.

Continuing with this example, semantic information about high end fashion geographic areas such as Rodeo Drive in Beverly Hills, Newbury Street in Boston, and 5$^{th}$ Avenue in New York City may include the same or similar keywords such as, high end retail stores, high end designers, luxury, shopping, vacation spot or tourist. For example, the data processing system 120 may receive a request for content from a user device 110 located at a latitude and longitude coordinate corresponding to a geographic area that includes at least a portion of Rodeo Drive in Beverley Hills. The data processing system 120 may identify, using a location feature index (e.g., the location feature index 300 stored in database 145 or otherwise accessed via network 105), non-geographic semantic keywords that map to the geographic location that includes at least a portion of Rodeo Drive where the user device 110 is located. The non-geographic semantic keywords may include vacation spot, tourist attraction or luxury shopping. The data processing system 120 may select content that is related to one or more keywords vacation spot, tourist attraction and luxury shopping. For example, the data processing system 120 may select an advertisement that is associated with keywords vacation spot and tourist attraction. In another example, the data processing system 120 may select content of a content provider 125 that indicated an interest in displaying content to user devices 110 that are associated with vacation spots that include luxury shopping. Responsive to this indication, the data processing system 120 may select a content of the content provider for display on the user device 110.

In one example, a content provider 125 (e.g., an advertiser or third party content provider) may want to provide their content items for display on user device 110 to users walking in a park who have children. In this example, the data processing system 120 can select, based on a location feature index that maps geographic locations to non-geographic semantic keywords, user devices 110b (shown in FIG. 2) that are in the geographic location 264. For example, the data processing system 120 can identify keywords children, park or walk as being relevant to the indicated display preference of the content provider 125, determine that these keywords comprise the set of keywords 310, or determine, using the location feature index, that the set of non-geographic semantic keywords 310 maps to a geographic location 264. Therefore, upon determining that a request for content was received from a user device 110b located within geographic area 264, the data processing system 120 may select the content providers 125 content for display on the user device 110b, or as a candidate for display on the user device 110b.

Figure 4:
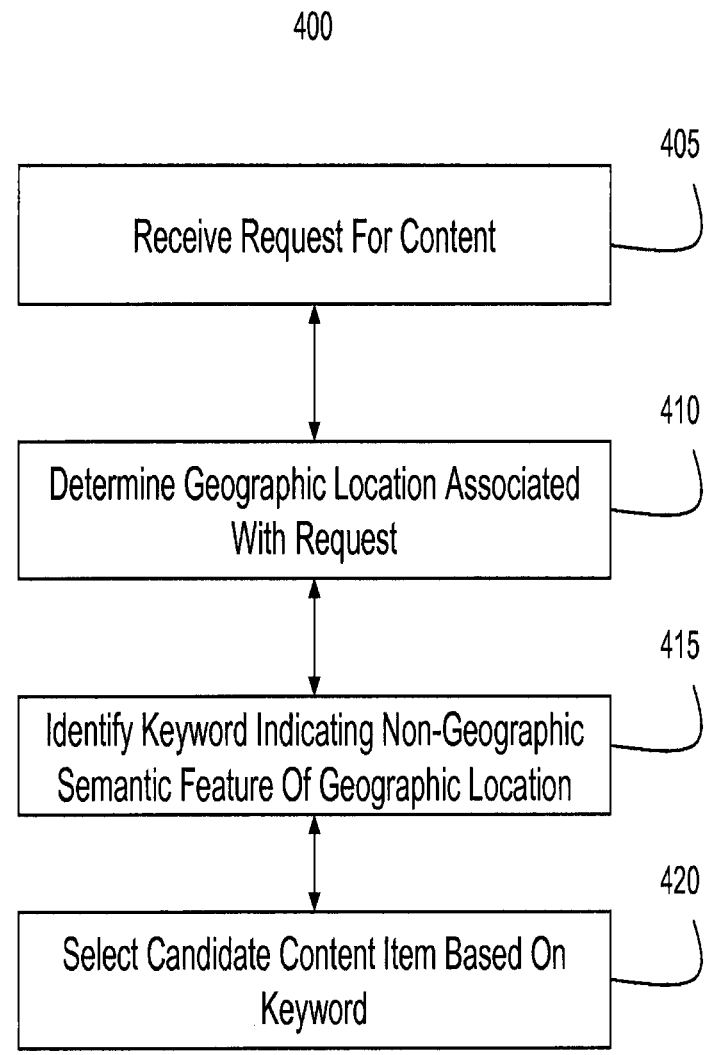
FIG. 4 is a flow chart illustrating an example method for providing content for display on a computing device via a computer network in accordance with an implementation.

FIG. 4 is a flow chart illustrating an example method 400 for selecting content using a location feature index. In brief overview, method 400 can include receiving a request for content (405). The method 400 can include determining a geographic location associated with the request (410). At 415, the method can include identifying a keyword indicating non-geographic semantic features of a geographic location. The method can include selecting a candidate content item based on the keyword (420).

In further detail, method 400 can include receiving a request for content (405). In some implementations, the request for content can include a request for an advertisement, text, images, multimedia content, or articles. In some implementations, the request can be sent by a computing device via a network, and received by a data processing system. In some implementations, the request may include information to facilitate content selection. In some implementations, a data processing system may request additional information from a computing device to facilitate content selection.

In some implementations, the method 400 can include determining a geographic location of the computing device associated with the request (410). For example, a data processing system may send a request to the computing device for geographic information. In another example, the request for content may include geographic information from which method 400 can determine a geographic location. In some implementations, method 400 identifies a geographic area corresponding to a geographic location such as a latitude and longitude coordinate, cell tower, or Wi-Fi hot spot location associated with the computing device.

In some implementations, the method 400 can include identifying a keyword indicating a non-geographic semantic feature of the determined geographic location (415). For example, the keyword may indicate that features of the geographic location include sunny, warm, and a park at which children play. The method 400 can identify the keywords using a location feature index which maps geographic locations or areas to non-geographic semantic keywords. In some implementations, multiple geographic areas may map to the same set of keywords or a subset of a set of keywords.

In some implementations, the method 400 can include selecting a content item for display on the computing device (420). For example, the method 400 may identify a content item that corresponds to the identified keywords. For example, the content item may include text that that matches the identified keywords, the content item may include metadata with keywords that match the identified keywords, or the content item may include text or keywords that are relevant to the keywords in another way (e.g., semantically related, root word match, topically related, etc.). In some implementations, the content item may include a candidate content item that is provided to an online bidding auction. One or more candidate content items may receive bids via the online auction, where the content associated with the highest bid may be selected for display on the computing device.

The system 100 and its components, such as a data processing system, may include hardware elements, such as one or more processors, logic devices, or circuits. FIG. 4 is an example implementation of a network environment 500. The system 100 and method 400 can operate in the network environment 500 depicted in FIG. 4. In brief overview, the network environment 500 includes one or more clients 505 that can be referred to as local machine(s) 505, client(s) 505, client node(s) 505, client machine(s) 505, client computer(s) 505, client device(s) 505, endpoint(s) 505, or endpoint node(s) 505) in communication with one or more servers 515 that can be referred to as server(s) 515, node 515, or remote machine(s) 515) via one or more networks 105. In some implementations, a client 505 has the capacity to function as both a client node seeking access to resources provided by a server and as a server providing access to hosted resources for other clients 505.

Figure 5:
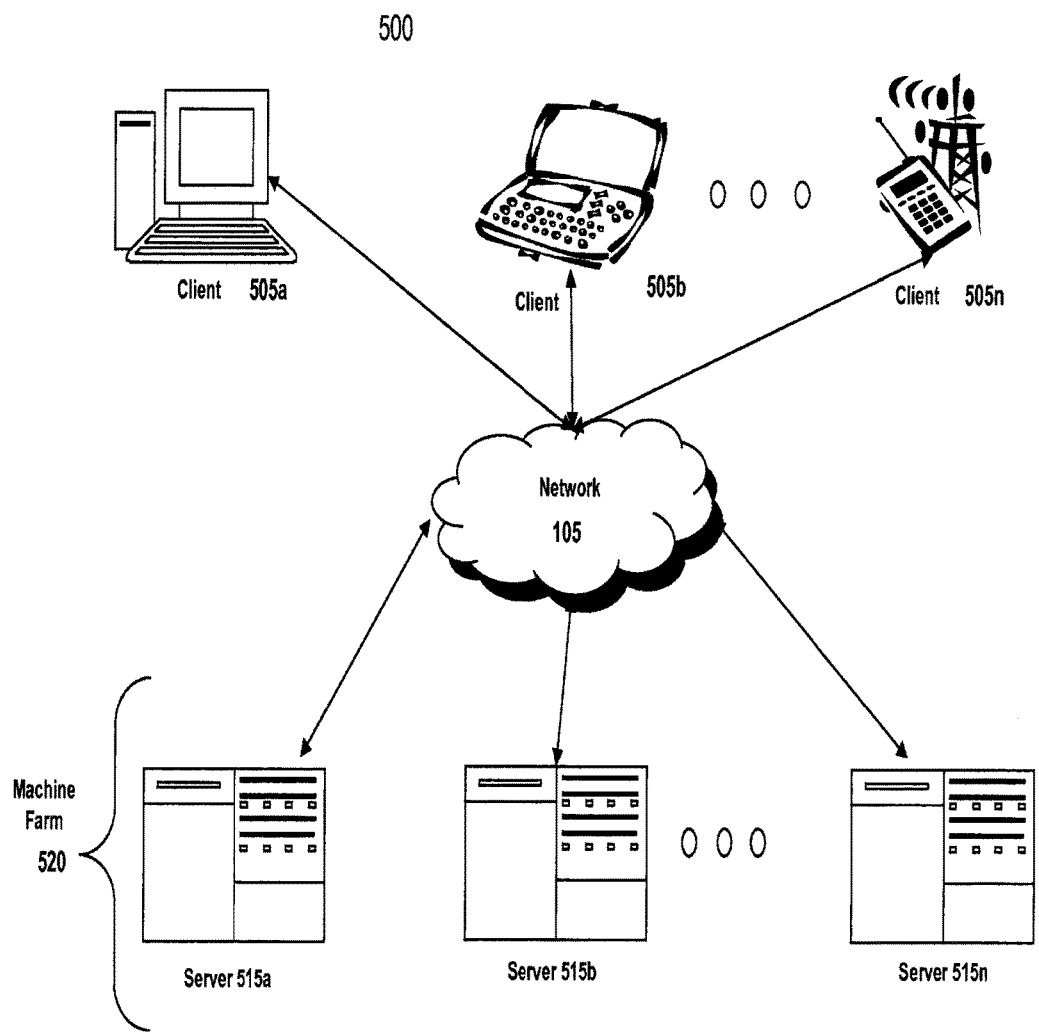
FIG. 5 shows an illustration of an example network environment comprising client machines in communication with remote machines in accordance with an implementation.

Although FIG. 5 shows a network 105 between the clients 505 and the servers 515, the clients 505 and the servers 515 may be on the same network 105. The network 105 can be a local-area network (LAN), such as a company Intranet, a metropolitan area network (MAN), or a wide area network (WAN), such as the Internet or the World Wide Web. In some implementations, there are multiple networks 105 between the clients 105 and the servers 515. In one of these implementations, the network 105 may be a public network, a private network, or may include combinations of public and private networks.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some implementations, the network 105 may include a wireless link, such as an infrared channel or satellite band. The topology of the network 105 may include a bus, star, or ring network topology. The network may include mobile telephone networks utilizing any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). In some implementations, different types of data may be transmitted via different protocols. In other implementations, the same types of data may be transmitted via different protocols.

In some implementations, the system 100 may include multiple, logically-grouped servers 515. In one of these implementations, the logical group of servers may be referred to as a server farm 520 or a machine farm 520. In another of these implementations, the servers 515 may be geographically dispersed. In other implementations, a machine farm 520 may be administered as a single entity. In still other implementations, the machine farm 520 includes a plurality of machine farms 520. The servers 515 within each machine farm 520 can be heterogeneous—one or more of the servers 515 or machines 515 can operate according to one type of operating system platform.

In one implementation, servers 515 in the machine farm 520 may be stored in high-density rack systems, along with associated storage systems, and located in an enterprise data center. In this implementation, consolidating the servers 515 in this way may improve system manageability, data security, the physical security of the system, and system performance by locating servers 515 and high performance storage systems on localized high performance networks. Centralizing the servers 515 and storage systems and coupling them with advanced system management tools allows more efficient use of server resources.

The servers 515 of each machine farm 520 do not need to be physically proximate to another server 515 in the same machine farm 520. Thus, the group of servers 515 logically grouped as a machine farm 520 may be interconnected using a wide-area network (WAN) connection or a metropolitan-area network (MAN) connection. For example, a machine farm 520 may include servers 515 physically located in different continents or different regions of a continent, country, state, city, campus, or room. Data transmission speeds between servers 515 in the machine farm 520 can be increased if the servers 515 are connected using a local-area network (LAN) connection or some form of direct connection. Additionally, a heterogeneous machine farm 520 may include one or more servers 515 operating according to a type of operating system, while one or more other servers 515 execute one or more types of hypervisors rather than operating systems. In these implementations, hypervisors may be used to emulate virtual hardware, partition physical hardware, virtualize physical hardware, and execute virtual machines that provide access to computing environments.

Management of the machine farm 520 may be de-centralized. For example, one or more servers 515 may comprise components, subsystems and circuits to support one or more management services for the machine farm 520. In one of these implementations, one or more servers 515 provide functionality for management of dynamic data, including techniques for handling failover, data replication, and increasing the robustness of the machine farm 520. Each server 515 may communicate with a persistent store and, in some implementations, with a dynamic store.

Server 515 may include a file server, application server, web server, proxy server, appliance, network appliance, gateway, gateway, gateway server, virtualization server, deployment server, secure sockets layer virtual private network ("SSL VPN") server, or firewall. In one implementation, the server 515 may be referred to as a remote machine or a node.

The client 505 and server 515 may be deployed as or executed on any type and form of computing device, such as a computer, network device or appliance capable of communicating on any type and form of network and performing the operations described herein.

Figure 6:
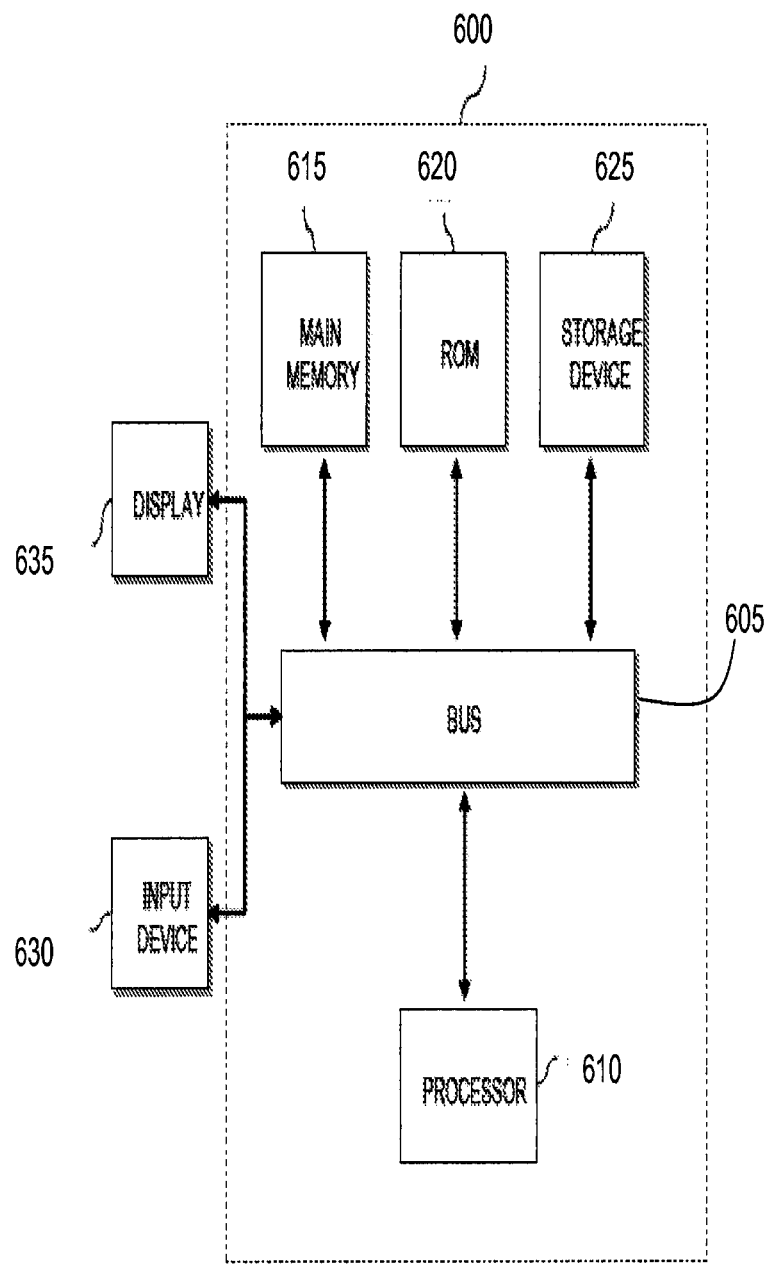
FIG. 6 is a block diagram illustrating a general architecture for a computer system that may be employed to implement various elements of the system shown in FIG. 1 and the method shown in FIG. 4, in accordance with an implementation.

FIG. 6 is a block diagram of a computer system 600 in accordance with an illustrative implementation. The computer system or computing device 600 can be used to implement the system 100, content provider 125, user device 110, web site operator 115, data processing system 120, weighting circuit 130, content selector circuit 135, and database 140. The computing system 600 includes a bus 605 or other communication component for communicating information and a processor 610 or processing circuit coupled to the bus 605 for processing information. The computing system 600 can also include one or more processors 610 or processing circuits coupled to the bus for processing information. The computing system 600 also includes main memory 615, such as a random access memory (RAM) or other dynamic storage device, coupled to the bus 605 for storing information, and instructions to be executed by the processor 610. Main memory 615 can also be used for storing position information, temporary variables, or other intermediate information during execution of instructions by the processor 610. The computing system 600 may further include a read only memory (ROM) 620 or other static storage device coupled to the bus 605 for storing static information and instructions for the processor 610. A storage device 625, such as a solid state device, magnetic disk or optical disk, is coupled to the bus 605 for persistently storing information and instructions.

The computing system 600 may be coupled via the bus 605 to a display 635, such as a liquid crystal display, or active matrix display, for displaying information to a user. An input device 630, such as a keyboard including alphanumeric and other keys, may be coupled to the bus 605 for communicating information and command selections to the processor 610. In another implementation, the input device 630 has a touch screen display 635. The input device 630 can include a cursor control, such as a mouse, a trackball, or cursor direction keys, for communicating direction information and command selections to the processor 610 and for controlling cursor movement on the display 635.

According to various implementations, the processes described herein can be implemented by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement may also be employed to execute the instructions contained in main memory 615. In alternative implementations, hard-wired circuitry may be used in place of or in combination with software instructions to effect illustrative implementations. Thus, implementations are not limited to any specific combination of hardware circuitry and software.

Although an example computing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources.

The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of providing content via a computer network, comprising:
   receiving, by a data processing system via a sensor of a computing device, location information of the computing device;
   determining, by the data processing system based on the location information, a geographic location of the computing device;
   determining non-geographic semantic characteristics of a geographic area that is larger than, but includes, the geographic location of the computing device, based on at least one quantitative value of a population metric, a topographical metric, or a climate metric for the geographic area;
   prior to a request for content by the computing device and in response to determining the geographic location of the computing device, receiving, by the data processing system and from a database, a location feature index comprising a plurality of data structures with data pertaining to the geographic area that includes the geographic location of the computing device;
   searching the location feature index to identify a first data structure representing one or more of the non-geographic semantic characteristics of the geographic area;
   identifying, in the location feature index, a second data structure mapped to the first data structure, with the second data structure representing a particular keyword, wherein identification of the second data structure from the first data structure in the location feature index provides for keyword identification for the geographic area that is distinct from content of the request;
   selecting, by the data processing system, based on the identified second data structure representing the particular keyword, a candidate content item for display on the computing device, the candidate content item satisfying selection criteria indicating that the candidate content item is to be selected for the particular keyword; and
   providing, in response to the request for content by the computing device, the selected candidate content item to the computing device while the computing device is at the geographic location.

2. The method of claim 1, wherein the determined geographic location is a first geographic location and subject matter of the candidate content item indicates a second geographic location different from the first geographic location.

3. The method of claim 2, further comprising:
   mapping, in the location feature index, a first plurality of keywords to the first geographic location based on a characteristic of the first geographic location; and
   mapping, in the location feature index, the first plurality of keywords to the second geographic location based on a characteristic of the second geographic location.

4. The method of claim 1, further comprising:
   identifying the particular keyword from a plurality of keywords of the location feature index that correspond to the geographic area and that indicate non-geographic semantic characteristics of the geographic area.

5. The method of claim 1, further comprising:
   determining, from the location information, the geographic location as a latitude coordinate and a longitude coordinate associated with the received request for content; and
   wherein the geographic area that is identified includes the latitude coordinate and the longitude coordinate.

6. The method of claim 1, further comprising:
   generating the location feature index prior to receiving the request for content.

7. The method of claim 1, further comprising:
   receiving, by the data processing system, semantic information about the geographic area, the semantic information indicating various metrics associated with the geographic area;
   determining, based on the semantic information, a plurality of keywords; and
   mapping the plurality of keywords to the corresponding geographic area in the location feature index, wherein the particular keyword identified from the location feature index is identified from the plurality of keywords.

8. A non-transitory computer-readable medium storing instructions, that when executed, cause one or more processors to perform operations comprising:
   receiving, via a sensor of a computing device, location information of the computing device;
   determining, based on the location information, a geographic location of the computing device;
   determining non-geographic semantic characteristics of a geographic area that is larger than, but includes, the geographic location of the computing device, based on at least one quantitative value of a population metric, a topographical metric, or a climate metric for the geographic area;
   prior to a request for content by the computing device and in response to determining the geographic location of the computing device, receiving, from a database, a location feature index comprising a plurality of data structures with data pertaining to the geographic area that includes the geographic location of the computing device;

searching the location feature index to identify a first data structure representing one or more of the non-geographic semantic characteristics of the geographic area;

identifying, in the location feature index, a second data structure mapped to the first data structure, with the second data structure representing a particular keyword, wherein identification of the second data structure from the first data structure in the location feature index provides for keyword identification for the geographic area that is distinct from content of the request;

selecting, based on the identified second data structure representing the particular keyword, a candidate content item for display on the computing device, the candidate content item satisfying selection criteria indicating that the candidate content item is to be selected for the particular keyword; and providing, in response to the request for content by the computing device, the selected candidate content item to the computing device while the computing device is at the geographic location.

9. The non-transitory computer-readable medium of claim 8, wherein the determined geographic location is a first geographic location and subject matter of the candidate content item indicates a second geographic location different from the first geographic location.

10. The non-transitory computer-readable medium of claim 9, the operations further comprising:

mapping, in the location feature index, a first plurality of keywords to the first geographic location based on a characteristic of the first geographic location; and mapping, in the location feature index, the first plurality of keywords to the second geographic location based on a characteristic of the second geographic location.

11. The non-transitory computer-readable medium of claim 8, the operations further comprising:

identifying the particular keyword from a plurality of keywords of the location feature index that correspond to the geographic area and that indicate non-geographic semantic characteristics of the geographic area.

12. The non-transitory computer-readable medium of claim 8, the operations further comprising:

determining, from the location information, the geographic location as a latitude coordinate and a longitude coordinate associated with the received request for content; and wherein the geographic area that is identified includes the latitude coordinate and the longitude coordinate.

13. The non-transitory computer-readable medium of claim 8, the operations further comprising:

generating the location feature index prior to receiving the request for content.

14. The non-transitory computer-readable medium of claim 8, the operations further comprising:

receiving semantic information about the geographic area, the semantic information indicating various metrics associated with the geographic area;

determining, based on the semantic information, a plurality of keywords; and mapping the plurality of keywords to the corresponding geographic area in the location feature index, wherein the particular keyword identified from the location feature index is identified from the plurality of keywords.

15. A system comprising:

one or more processors; and one or more memory devices including instructions that, when executed, cause the one or more processors to perform operations comprising:

receiving, via a sensor of a computing device, location information of the computing device;

determining, based on the location information, a geographic location of the computing device;

determining non-geographic semantic characteristics of a geographic area that is larger than, but includes, the geographic location of the computing device, based on at least one quantitative value of a population metric, a topographical metric, or a climate metric for the geographic area;

prior to a request for content by the computing device and in response to determining the geographic location of the computing device, receiving, from a database, a location feature index comprising a plurality of data structures with data pertaining to the geographic area that includes the geographic location of the computing device;

searching the location feature index to identify a first data structure representing one or more of the non-geographic semantic characteristics of the geographic area;

identifying, in the location feature index, a second data structure mapped to the first data structure, with the second data structure representing a particular keyword, wherein identification of the second data structure from the first data structure in the location feature index provides for keyword identification for the geographic area that is distinct from content of the request;

selecting, based on the identified second data structure representing the particular keyword, a candidate content item for display on the computing device, the candidate content item satisfying selection criteria indicating that the candidate content item is to be selected for the particular keyword; and providing, in response to the request for content by the computing device, the selected candidate content item to the computing device while the computing device is at the geographic location.

16. The system of claim 15, wherein the determined geographic location is a first geographic location and subject matter of the candidate content item indicates a second geographic location different from the first geographic location.

17. The system of claim 16, the operations further comprising:

mapping, in the location feature index, a first plurality of keywords to the first geographic location based on a characteristic of the first geographic location; and mapping, in the location feature index, the first plurality of keywords to the second geographic location based on a characteristic of the second geographic location.

18. The system of claim 15, the operations further comprising:

identifying the particular keyword from a plurality of keywords of the location feature index that correspond to the geographic area and that indicate non-geographic semantic characteristics of the geographic area.

19. The system of claim 15, the operations further comprising:

determining, from the location information, the geographic location as a latitude coordinate and a longitude coordinate associated with the received request for content; and wherein the geographic area that is identified includes the latitude coordinate and the longitude coordinate.

20. The system of claim 15, the operations further comprising:

generating the location feature index prior to receiving the request for content.

* * * * *